United States Patent [19]

Kohama et al.

[11] Patent Number: 4,693,107
[45] Date of Patent: Sep. 15, 1987

[54] METHOD OF MANUFACTURING WOUND BUSH BEARING WITH NOTCH-FREE FLANGE AND MOLD ASSEMBLY FOR MANUFACTURING THE SAME

[75] Inventors: Masayuki Kohama, Moriyama; Tatsuro Wakabayashi; Kouichi Tsunoda, both of Shiga, all of Japan

[73] Assignee: Oils Industry Co., Ltd., Tokyo, Japan

[21] Appl. No.: 906,145

[22] Filed: Sep. 11, 1986

Related U.S. Application Data

[62] Division of Ser. No. 603,656, Apr. 25, 1984, Pat. No. 4,638,538.

[30] Foreign Application Priority Data

Apr. 28, 1983 [JP] Japan .................................. 58-74068

[51] Int. Cl.[4] ............................................. B21J 13/02
[52] U.S. Cl. ........................................ 72/354; 72/353; 72/361
[58] Field of Search ................. 72/352, 353, 354, 357, 72/359, 361, 418

[56] References Cited

U.S. PATENT DOCUMENTS

| | | | |
|---|---|---|---|
| 2,013,654 | 9/1935 | Hothersall | 72/354 |
| 2,177,584 | 10/1939 | Salansky . | |
| 2,374,596 | 4/1945 | Frederick | 72/361 |
| 2,722,047 | 11/1955 | Cousino . | |
| 2,877,675 | 3/1959 | Corbeels et al. | 72/352 |
| 2,949,051 | 8/1960 | Hoffman et al. . | |
| 4,048,703 | 9/1977 | Lehnhart . | |
| 4,078,414 | 3/1978 | Orain . | |
| 4,207,761 | 6/1980 | Niemi | 72/354 |

FOREIGN PATENT DOCUMENTS

740363 6/1980 U.S.S.R. .

OTHER PUBLICATIONS

Japanese Patent Application Laying Open (KOKAI) No. 54-25352, Feb. 1979.

Primary Examiner—Lowell A. Larson
Attorney, Agent, or Firm—Michael N. Meller

[57] ABSTRACT

A bearing is manufactured by applying an axial pressing force to a cylindrical wound bush and thereby forming a notch-free flange at one end of the bush which is tapered previously. The flange is formed through a kind of plastic flow induced in the tapered end by the force.

12 Claims, 13 Drawing Figures

METHOD OF MANUFACTURING WOUND BUSH BEARING WITH NOTCH-FREE FLANGE AND MOLD ASSEMBLY FOR MANUFACTURING THE SAME

CROSS-REFERENCE TO RLEATED APPLICATION

This application is a divisional application of Ser. No. 603,656 filed Apr. 25, 1984, now U.S. Pat. No. 4,638,538 granted Jan. 27, 1987.

FIELD OF THE INVENTION

The present invention relates to a method of manufacturing a wound bush bearing with a notch-free flange as well as a mold assembly for use in the method of manufacturing the same.

BACKGROUND OF THE INVENTION

A large number of wound bush bearings have been prepared by winding a thin metal sheet into a cylindrical shape which is called as a "wound bush". However it has scarcely been known that a notch-free flange is integrated uniformly to the cylindrical portion i.e. wound bush of the bearings. The difficulty of preparing the bearings with an integrated notch-free flange resides in that when one end of the cylindrical wound bush is bent outwardly to form an outer flange, a gap is formed inevitably at the abutted or joined portion J of the wound bush as shown in FIG. 1, to resulting in a flange with a sector-shaped notch D.

Particularly, in the case of producing a bearing comprising a composite layer in which a synthetic resin coating layer is provided on the inner circumferertial surface of the wound bush and on the flange surface continuous therewith, scratches are liable to result in the resin layer in the course of formation of the flange, because of which more complicated steps have been required to form a wound bush bearing with a notch-free flange having at least a coating layer throughout the inner surface of the wound bush and the side of the flange. The flange part of the bearing generally serves to receive the thrust load and also provides any one of the functions of anti-slip-off, anti-rotation or the like for the bearing.

Since the presence of the notch in the flange part, which is the pressure-receiving surface, generally provides no significant troubles when the bearing is exposed to a thrust load, the wound bush bearings may be used in certain cases, while leaving the notch in the flange part as it is. However, these bearings with a flange having the notch involve the following problems:

(1) this useless notch in the flange part reduces the commercial value of products,
(2) the notch in the flange part may tend to damage the mating component when a thrust load is applied to the flange part together with an impact shock, and
(3) since the flange part having such notch contains concentrated radial deformations generated therein during the formation of the flange, it requires troublesome working procedures such as additional pressing and/or trimming work by using a grinding bite after the bending fabrication, even if the bearing is used while leaving the notch in the flange as it is.

SUMMARY OF THE INVENTION

The invention has been accomplished in order to solve the problems as mentioned in the above.

Accordingly, the invention provides a method of manufacturing a wound bush bearing with a flange from which any undesirable notch is excluded, which method comprises the steps of (a) forming a uniform tapering to at least one of the outer and inner circumferential surfaces at one end portion of a cylindrical wound bush workpiece so that the radial thickness of the end portion becomes thinner toward the end face, (b) at least restricting uniformly the outer surface of the cylindrical surface except the tapered portion toward the axial center of the cylindrical bush workpiece, (c) pressing the tapered wound bush workpiece toward the axial line of the bush workpiece in order to bend the tapered portion outwardly and (d) restricting the outer circumferential edge of the bent portion by means of a circumferential face having a radial size smaller than the axially bent width of the bent portion in the step (c), thereby causing a pressing force toward the axial center of the cylindrical workpiece in the flange part, which is being formed, to generate a kind of plastic flow therein.

The invention also provides a mold assembly for use in the manufacturing method as described in the above.

The invention further provides a method of efficiently manufacturing a desired wound bush bearing with a notch-free flange by using a rotary mold assembly comprising at least a die fitted in a rotary table, carrying out each of the steps of charging a bush workpiece into the die, forming a notch-free flange in the die and taking out a product simultaneously of a wound bush bearing with a notch-free flange frox: the die in one mold closure stroke and repeatingly carrying out these steps while rotating the die sequentially by means of the rotary table.

At first a wound bush workpiece is tapered at one axial end portion or a wound bush workpiece previously tapered at one axial end portion is prepared through any convenient means.

Then, the wound bush workpiece is charged from the opening to the inside cavity of a die and retained therein by utilizing the resilient repellent force of the workpiece exerted in the radial direction. Then, the lower punch and the pressing punch are fitted into the cavity at the respective openings of the dies to press the work in the axial direction.

The cavity of the die comprises a smaller diameter bore in which the workpiece is fitted and retained, and a larger diameter bore continuous with the smaller diameter bore by way of a shoulder, and the workpiece is pressed so that the tapered portion thereof is bent in the larger diameter bore.

The outer circumference of the bent portion of the workpiece abut the wall of the larger diameter bore in the cavity and the movement of enlarging the diameter of the portion is thereby restricted to generate a pressing force on the flange now being formed along the axial direction of the workpiece from the outer circumferential surface of the flange, whereby a plastic flow is caused in the flange part to form a notch-free flange.

Then, when the mold is opened, the flanged wound bush product is left within the cavity, and it is expelled by a projecting punch out of the mold.

In accordance with the invention, a plurality (usually three or four) of dies are arranged on the rotary table, whereby each of the steps of fitting the workpiece into the cavity (work charging), pressing the workpiece (flange formation) and ejecting the product are performed simultaneously at one mold closure operation and efficiently by repeating the steps successively.

The wound bush workpieces to be formed according to the invention can include, for instance, those made of thin wound sheet made of bearing alloys, those of a two layer structure in which the cast layer or sintered layer of bearing metal or a plastic layer is formed on a cold-rolled steel sheet, or those of a three-layer structure prepared by providing a porous sintered metal layer on the surface of a thin steel sheet and further charging to deposit thereon a flow frictional plastic layer or the like. The invention is particularly suitable to the formation of a flange by using a workpiece comprising the three-layer structure.

In the invention, the taper formed to the axial end portion of the workpiece prior to the formation of the flange is applied to the outer circumferential surface of the bush in the case where it is desired to incorporate a plastic or other similar deposition layer on the flange surface and may be applied to the inner circumferential surface or both of the inner and the outer circumferential surfaces in the case other than the composite layer structure or in the case of a composite layer structure where no deposition layer is neoessary on the flange surface.

The formation of the taper is important for preparing a notch-free flange in view of each generation of the plastic flow and it is particularly essential upon production of a wound bush bearing with a flange of a composite layer structure.

It be necessary that the length L of the taper is made greater than $W-t$, that is, greater than the width w at the back face of the flange as shown in FIGS. 2 and 3, where W is the flange width and t is the thickness in the cylindrical portion of a flanged wound-bush product.

According to the experiment made by the present inventors, it has been found that satisfactory results can be obtained by setting $L=\alpha w$ and $\alpha 1.1-2.2$.

The value for $\alpha$ may vary depending on the plastic flowing property of the material employed, the presence or absence and the structure of the coating layer on the flange surface, the thickness of the flange to be formed or the like. In the case where the resin coating layer is present on the flange surface, for instance, the value for $\alpha$ is preferably set somewhat larger than the value at the midst of the above range. On the other hand, in the case where there is no resin coating layer on the flange surface, the value for $\alpha$ is preferably chosen from the lower region within the above range.

Next, the depth S for the taper may vary depending on the same factors as those for the length L and the thickness t of the cylindrical portion. It is preferred to set the depth S to 166 of the taper length L as a standard value, provided that if the flange width is considerably larger, the taper depth S is made smaller than ⅓ of the length L.

Furthermore, the unique feature of the wound bush bearing with flange according to the invention is that the thickness f of the flange can be made equal to or somewhat larger or smaller than the thickness t of the cylindrical portion. The thickness f is determined depending on the mutual relationship of the length L, the depth S and the flange width W to be obtained (or rearface width w of the flange).

The formation of the chamfered taper portion is important for facilitating the flange formation by the use of a mold and it is an essential condition in the production of a wound bush having a coating layer on the slide face-forming surface. Without the tapered portion, the coating layer is damaged severely, thereby failing to obtain a satisfactory wound bush with flange.

By the provision of such a tapered portion on the workpiece, the deformation due to the tension in the workpiece surface caused by bending and the compressive deformation due to the pressing force from the outer circumference of the flange part to the axial center of the bush are liable to be offset by each other, thereby causing no damage to the coating layer.

Moreover, in the wound bush bearing with a notch-free flange according to the invention, which is different from those conventional wound bush bearings prepared by merely rolling the bush, since a pressing force is applied toward the axial center of the workpiece upon formation of the flange, an upsetting effect is applied, whereby the product thus obtained has an advantage that the flange part is free from the notch D, as well as that the gap in the abutted portion J due to the springback force is extremely reduced, and the dimensional accuracy can be significantly improved as shown in FIG. 4.

Referring then to the structure of a mold assembly according to the invention, the mold assembly used for the manufacturing method of the invention includes a lower mold comprising a die holder, a lower punch, a stationary table, a rotary table, a plurality of dies, a die return device and a stopper device for the rotary table, as well as an upper mold comprising a charging punch, a press punch, an ejecting punch and a punch holder for securing these punches.

The die holder forms a base block for the lower mold, on which the lower punch is secured and the stationary table is mounted.

The lower punch comprises a smaller diameter portion over which the inner diameter part of the wound bush workpiece is fitted and a larger diameter portion formed continuous with the smaller diameter portion by way of the rounded curve surface, at which a shoulder is formed, and the lower punch is secured at the larger diameter portion thereof to the die holder.

The stationary table has a first aperture and a second aperture passing through the upper and the lower surfaces thereof.

The first aperture has a bore diameter in which the die disposed on the stationary table can be tightly fitted and the second aperture has a diameter smaller than that of the first aperture and greater than that of the greater diameter portion of the lower punch.

The stationary table is secured to the die holder in such a way that the axial center for the first aperture is aligned with the axial center for the lower punch. The lower punch is disposed in the first aperture and has such a height that it does not protrude from the opening of the aperture.

The second aperture is continuous to with a product take-out hole formed in the die holder and in communication with the outer side of the mold.

The rotary table is situated above the stationary table and rotatably placed thereon around a rotational axis which is perpendicular to the plane of the stationary table at "one point" equally spaced apart from the center for the opening of the first aperture and the center of the second aperture in the stationary table.

A plurality of apertures are formed in the rotary table, passing through the upper and the lower surfaces thereof, and these apertures are arranged on the rotary table such that the axial center lines for any adjacent apertures may be aligned with the axial center lines for the first aperture and the second aperture when the rotary table rotates.

For instance, in the case where three apertures (into which respective dies are arranged to engage) are provided on the rotary table placed on the stationary table with its rotational axis being disposed as described above, the three apertures are arranged in such a positional relation that each of the axial center lines thereof is located on each vertex of an equilateral triangle each side of which is equal to the center-to-center distance of the openings for the first aperture and the second aperture in the stationary table and the center of which is aligned with "a point" on the stationary table.

In another case where four apertures (into which respective dies are arranged to engage) are provided on the rotary table, the four apertures are arranged in such a positional relation that each of the axial center lines thereof is located on a respective vertex of a square each side of which is equal to the center-to-center distance of the openings for the first aperture and the second aperture in the stationary table and the center of which is aligned with "a point" on the stationary table.

Each of the dies has a cavity comprising a small diameter bore opened at one end thereof and a larger diameter bore which is continuous with the smaller diameter bore and opens at the other end thereof with a bore diameter capable of fitting with the larger diameter portion of the lower punch, as well as an outer circumferential portion capable of fitting into the first aperture in the stationary table.

Each of the dies is placed at the end thereof, where the larger diameter bore opens, on the stationary table and is engaged at the outer circumferential portion thereof to each of the plurality of apertures in the rotary table.

While the die can slide on the stationary table during the rotation of the rotary table, it engages at the outer circumferential portion thereof the aperture in the rotary table and, therefore, is restricted from movement away from the stationary table and producing a clearance with respect thereto.

The charging punch, the pressing punch and the ejecting punch are respectively secured on the punch holder which constitutes the base block for the upper mold.

The pressing punch has one end face which is opposed to the lower punch located within the first aperture in the stationary table on the same axial line therewith and presses the die brought into the position for the first aperture by the rotation of the rotary table into the first aperture, and another end face which is protrudes from the one end face and fits into the smaller diameter bore in the die cavity and presses the workpiece charged therein toward the axial line of the workpiece.

The projecting ejecting punch comprises an end face for fitting into the smaller diameter bore in the die cavity brought to the position for the second aperture in the stationary table and ejecting the product formed with flange out of the cavity.

The charging punch comprises an end face for fitting into the smaller diameter bore of the die cavity when the die after being completely ejected is further brought into a predetermined position by the rotation of the rotary table and charging the supplied workpiece therein.

The die return device comprises a supporting portion disposed within the first aperture in the stationary table and a spring means for resiliently urging the supporting portion. The supporting portion retains the die brought to the position for the first aperture in the stationary table at that position while maintaining the engagement of the die with the rotational table. The spring means resiliently biases the supporting portion toward the opening of the first aperture such that the die forced into the first aperture together with the supporting portion may be returned to the original position at the same time with the mold opening operation.

The stopper device for the rotary table temporarily couples the rotary table to the stationary portion, such as the die holder or the stationary table, when the rotary table rotates to bring the die to the position for the first aperture in the stationary plate and at a predetermined position capable of engagement with the upper mold and then retains the rotary table at that position.

After the pressing work has been done once, the engagement of the stopper device is detached manually or by electromagnetic means to enable the rotation of the rotary table, whereafter the same steps as described above are repeated.

In the mold assembly according to this invention, the die holder is secured to the machine table of a pressing machine and the punch holder is secured to the ram of a pressing machine respectively. The charging of the work, the press-formation of the flange and the ejection of the product formed with the flange by means of the charging punch, the pressing punch and the ejecting punch are carried out respectively and simultaneously in one mold closure operation. Then, the rotary table rotates at the same time with the mold opening operation to feed each of the dies to its succeeding step so that the same steps can be can be repeated.

The wound bush workpiece for use in this invention has a slight gap at the abutted portion J in a state where it is left free and formed into a predetermined size when the abutted portion is joined.

Accordingly, upon feeding a workpiece into the die cavity die, it is impossible to charge the workpiece by its own weight to a predetermined position of the cavity. Thus, it is preferred, upon feeding the workpiece to the die, to carry out the step of feeding the workpiece and the step of charging the workpiece to the predetermined position separately.

In such a method, a fourth die is provided in the rotary table in addition to the dies for charging, pressing and ejection.

As already described above, when the fourth die is moved to the next step during the rotation of the rotary table, it is disposed in such a relationship together with other dies that the charging, pressing and ejection are carried out simultaneously.

The mold assembly having four dies arranged in this way can be mounted in such an arrangement that the press punch of the upper mold and the lower punch of the lower mold, which are subjected to the most heavy load are situated at the center of the press assembly, the charging and the ejecting punches are somewhat displaced from the position for the center of the assembly, and the die rotated to the next step succeeding the ejection, that is, returned to the initial step (work feeding step), is positioned out of the dangerous zone of the pressing work.

Employment of such a mounting arrangement in the press assembly is advantageous in that workpiece can be supplied irrespective of the pressing operation both in the case where the workpiece is supplied manually by the worker or supplied by using an automatic feeder.

When the die is returned to the home position by the die return device after the flange formation has been completed according to this invention, the product is detached from the lower punch while fitted in the die cavity, transferred to the next step during the rotation of the rotary table, ejected from the cavity by the ejecting punch, and then removed from the mold assembly.

There is no trouble in the removed step arising from the fact that the product clings to the lower punch and only the die is returned to the home position, because the frictional coefficient between the cavity and the outer circumferential surface of the product is greater than the frictional coefficient between the lower punch and the inner bore of the product after the completion of the pressing step.

The second embodiment of the mold assembly for use in the manufacturing process according to this invention is a clamping mold in which a portion, corresponding to the smaller diameter bore of the cavity in the mold assembly of the first embodiment, is vertically split into at least two portions. In this embodiment, since the vertically split portions are no longer in contact with the outer cylindrical portion of the bush upon mold opening but only the outer circumferential surface of the flange is in contact with the cavity, the wound bush bearing product tends to cling to the lower punch in cases where the frictional coefficient at the outer cylindrical portion is approximately equal to or even lower than that at the inner cylindrical portion of the wound bush bearing product, whereby the removal operation of the wound bush bearing product becomes troublesome, thereby worsening the workability somewhat, particularly in the case of mass production. However, this second embodiment is convenient in that the size of the mold can be reduced.

BRIEF DESCRIPTION OF ACCOMPANYING DRAWINGS

The invention is to be described in more detail referring to the accompanying drawings, by which the foregoing and other objects, as well as the features of the invention, will be made clearer, in which:

FIG. 1 is a perspective view for a conventional wound bush bearing with a notched flange, FIG. 2 is a vertical cross-sectional view for a wound bush workpiece to be treated in accordance with the invention, FIG. 3 is a vertical cross-sectional view of a wound bush bearing with a notch-free flange manufactured according to the invention, FIG. 4 is a perspective view of a wound bush bearing with a notch-free flange manufactured according to the invention, FIG. 5 is a plan view of a lower half of a mold assembly, that is, a lower mold for manufacturing the wound bush bearing with a notch-free flange according to the invention.

FIG. 6 is a side elevational view of the lower mold in the mold assembly for manufacturing the wound bush bearing with a notch-free flange according to the invention, FIG. 7 is a cross-sectional view taken along line VII—VII in FIG. 5, FIG. 8 is a cross-sectional view taken along line VIII—VIII in FIG. 5, FIG. 9 is a plan view for the upper half of the mold, that is, an upper mold for manufacturing the wound bush bearing with a notch-free flange according to the invention, FIG. 10 is a cross-sectional view taken along line X—X in FIG. 9, FIG. 11 is a cross-sectional view taken along line VII—VII in FIG. 5 in a state where a wound bush bearing is being manufactured by combining, that is, closing the upper half and the lower half of the mold assembly for manufacturing the wound bush bearing with a notch-free flange according to the invention, FIG. 12 is a cross-sectional view taken along line VIII—VIII in FIG. 5 in a state where a wound bush bearing is being manufactured by combining, that is, closing the upper and lower halves of the mold assembly for manufacturing the wound bush bearing with a notch-free flange according to the invention, and FIG. 13 is a cross-sectional view showing the state where a bush bearing is being manufactured by using another embodiment of the mold assembly for manufacturing the wound bush bearing with a notch-free flange according to the invention.

DESCRIPTION OF THE PREFERRED EMBODIMENTS

Figure 1:
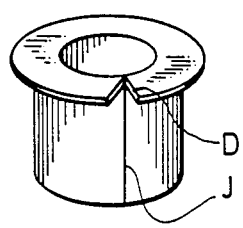

In FIGS. 5 through 8 are shown a die holder 1, a product removal hole 2 and a lower punch 3 having a smaller diameter portion 4, a larger diameter portion 5 and a shoulder 6 with a rounded surface. The lower punch 3 is secured at the end of the larger diameter portion 5 to the die holder 1.

A stationary table 7 has a first aperture 8 and a second aperture 9 respectively extending from the upper to the lower surface thereof. A recessed groove 10 is formed from the second aperture 9 to the outer circumferential surface of the stationary table 7 and joins with a recessed groove 11 formed in the die holder 1 to constitute the product take-out hole 2 as described above.

The stationary table 7 is secured to the die holder 1 by means of setting bolts or the like (not illustrated in the figure) in a positional relationship such that the axial center for the first aperture 8 is aligned with the axial center for the lower punch 3 as described above, and the second aperture 9 is in communication with the recessed groove 11 in the die holder 1 as described above.

A rotary table 12 has apertures extending from the upper to the lower surface thereof having larger diameter portions 13A–13D and smaller diameter portions 14A–14D respectively. The bore diameter for the larger diameter portions 13A–13D is equal to the diameter for the first aperture 8 in the stationary table 7.

Dies 15A–15D have smaller outer circumferential portions 16A–16D and larger outer circumferential portions 17A–17D respectively. The dies 15A–15D include cavities 18A-18D having smaller diameter bores 19A-19D and larger diameter bores 20A-20D respectively. The dies have upper faces 21A-21D and lower faces 22A-22D respectively.

The dies 15A-15D are placed with their lower faces 22A-22D on the stationary table 7, with the smaller outer circumferential portions 16A-16D and the larger outer circumferential portions 17A-17D abutting respectively the smaller diameter portions 14A-14D and the larger diameter portions 13A-13D of the apertures in the rotatable table 12.

As the rotary table 12 rotates, the dies 15A-15D move clockwise (in FIG. 5) on the stationary table 7. Since the dies are fitted in the rotary table 12 as described above, their upward movement away from the stationary table 7 is restricted.

A die return device 23 comprises a support 24 for supporting the lower faces 22A-22D of the dies 15A-15D in the same plane with the upper surface of the stationary table 7 when the dies are turned around above the first aperture 8 in the stationary table 7. Rods 25, are secured to the support 24 and extend downwardly, passing through the die holder 1 to be connected to appropriate spring means (not illustrated). The spring means always bias the support 24 upwardly by way of the rods 25.

The spring means may be formed with coil springs, pneumatic springs or elastic rubber members. For instance, in the manufacture of a wound bush bearing with a flange of bout 20–30 mm in diameter and 15–20 mm in length, a commercially available die cushion having a cushioning capability of about 1.5–5.0 kg/cm² may be used.

The rotary table 12 has a rotational shaft 31 equipped with nuts 32 and radial and thrust bearings 33 and 34.

The axial line for the rotational shaft 31 is in perpendicular to the plane of the stationary table 7 at "one point" on the table 7 situated at an equal distance from the center of the opening for the first aperture 8 and that for the second aperture 9 in the stationary table 7.

The apertures comprising the larger diameter portions 13A-13D and the smaller diameter portions 14A-14D formed in the rotary table 12 are disposed such that each of the axial centers thereof may be situated at each vertex of a square, the center of which is aligned with the axial line of the rotational shaft 31 and each one side of which is equal to the center-to-center distance of the opening for the first aperture 8 and that for the second aperture 9.

Accordingly, any two adjacent dies, e.g. dies 15C, 15D of the dies 15A-15D which are arranged while being engaged respectively to the four apertures in the rotating table 12 such that the respective axial lines of the dies are aligned with the first aperture 8 and the second aperture 9 in the stationary table 7.

A stopper device 26 for the rotary table 12 is secured by its base block 27 to the die holder 1, for instance, by means of setting bolts or the like (not illustrated).

The base block 27 has an engaging pin 28 supported thereon and a spring 29 for biasing the engaging pin 28 such that the top end of the pin 28 is always in resilient sliding contact with the outer circumferential surface of the rotary table 12.

Engaging holes 30A-30D are formed in the outer circumferential surface of the rotary table 12, and they are adapted such that when the top end of the engaging pin 28 is fitted into one of the engaging holes 30A-30D, any two adjacent dies, e.g., dies 15C, 15D, that are arranged fittedly in the rotary table 12 are aligned at the axial lines thereof with the axial lines of the first aperture 8 and the second aperture 9 in the stationary table 7 respectively. Accordingly, in the case where four dies 15A-15D are arranged as in this embodiment, four engaging holes 30A-30D are formed in the outer circumferential surface of the rotary table 12.

The stopper device 26 has a function of temporarily stopping the rotation of the rotary table 12 and, in addition, a positioning function of stopping the dies 15A-15D at their predetermined positions.

The engaging pins 28 can be disengaged from the rotary table 12 by temporarily withdrawing the engaging pin 28 manually or by the use of electromagnetic means and, thereafter, the rotary table 12 can be rotated manually or electrically. In this way, positioning of the rotary table 12 with respet to the stationary table 7 and, thus, the positioning for the dies 15A-15D can be attained.

Figure 9:
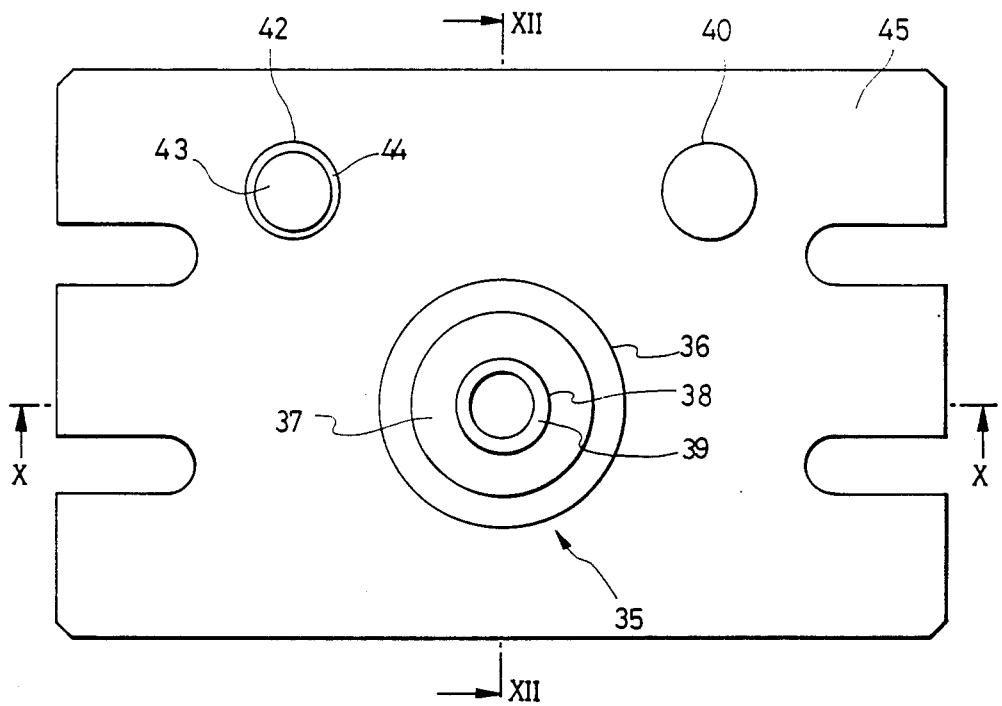
Figure 10:
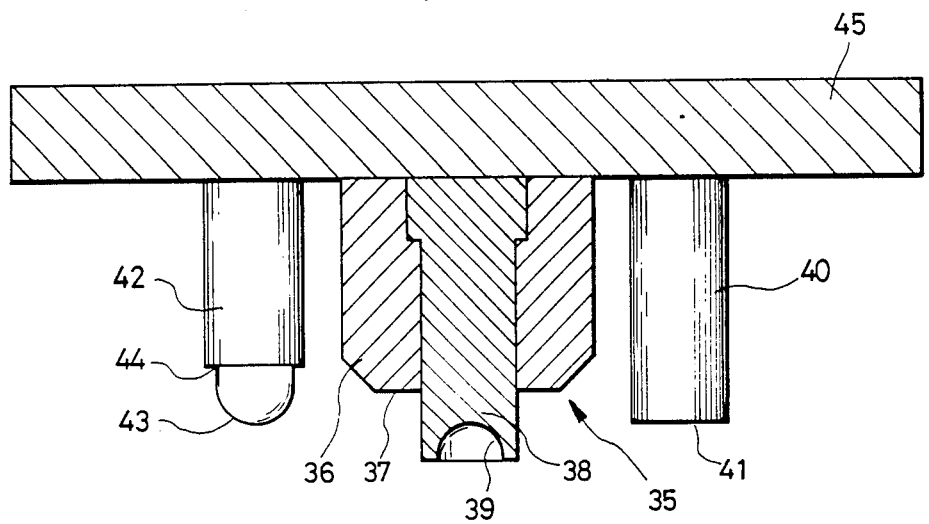

FIG. 9 is a plan view for the upper half of the mold assembly, that is, the upper mold for manufacturing the wound bush bearing with flange according to this invention and FIG. 10 is a cross-sectional view taken along line X—X in FIG. 9.

A pressing punch 35 comprises a base block 36, an end face 37 formed flat at the lower end of the base block and a punch main body 38 embraced within the base block 36, which is secured to a punch holder 45 to be described later.

The punch main body 38 has an end face 39 protruded from the end face 37 of the base block 36.

An ejecting punch 40 has an end face 41. A charging punch 42 comprises a smaller diameter portion 43 formed at the top end thereof and a shoulder 44 integrally formed with the smaller diameter portion 43 for constituting the end face of the punch 42.

A punch holder 45 secures to retain thereon the pressing punch 35, the injecting punch 40 and the charging punch 42 respectively to form the upper mold. The punch holder 45 is secured to the ram of a press machine(not shown).

The respective axial lines for the pressing punch 35 and the ejecting punch 40 are aligned with the respective axial lines for the first aperture 8 and the second aperture 9 formed in the stationary table 7 of the lower mold and the punches 35 and 40 are opposed to these apertures 8 and 9 respectively.

The pressing punch 35 and the ejecting punch 40 in the upper mold are in the above-described positional relationship with the lower mold and, when the dies 15A-15D are brought into the positions aligning with the first aperture 8 and the second aperture 9 respectively during the rotation of the rotary table 12, the charging punch 42 on the upper mold opposes the die 15B which is at the stage preceding the die 15C situated at the first aperture 8 with their axial lines being aligned with respect to each other.

Figure 5:
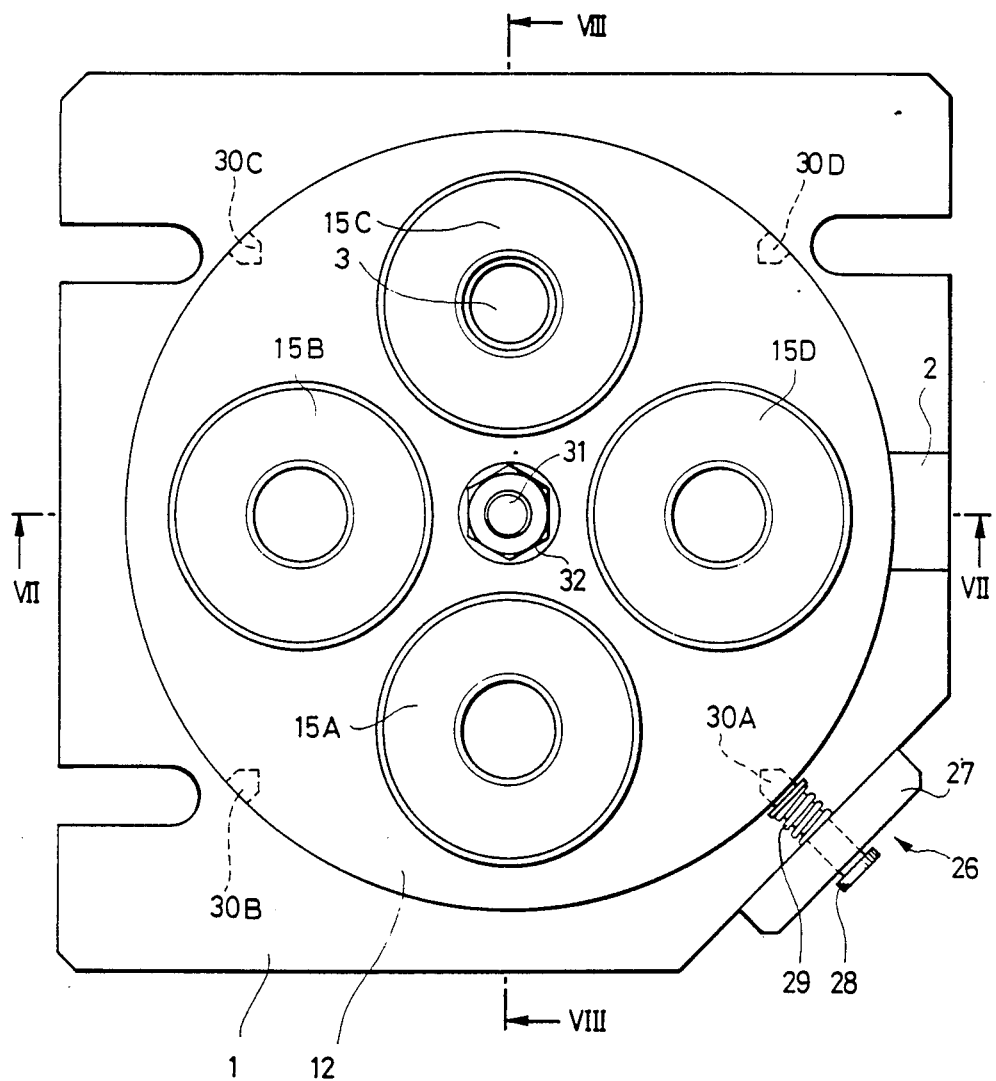
FIG. 5 shows a plan view for the lower half of a mold assembly, that is, a lower mold for manufacturing a wound bush bearing with a notch-free flange according to the invention in which four dies are arranged on a rotary table.
Figure 6:
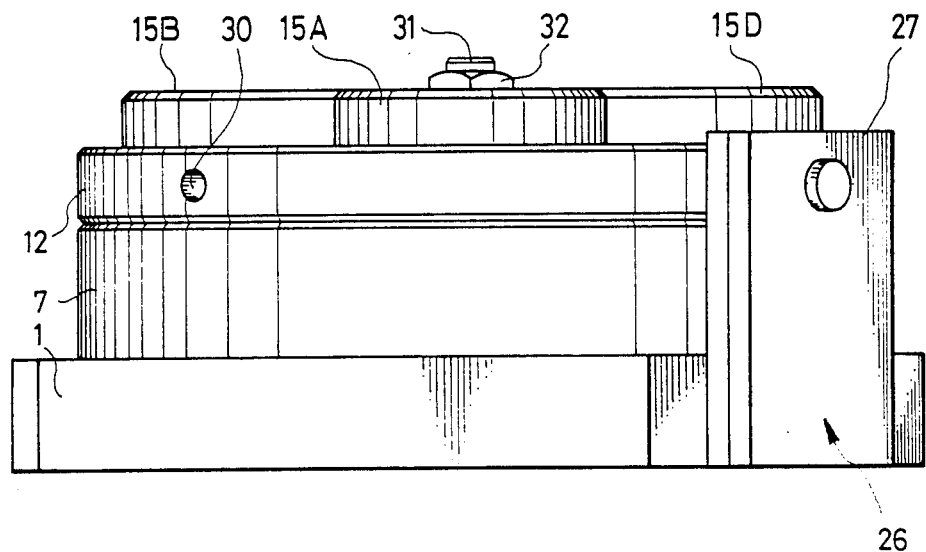
FIG. 6 is a side elevational view for the lower die.
Figure 7:
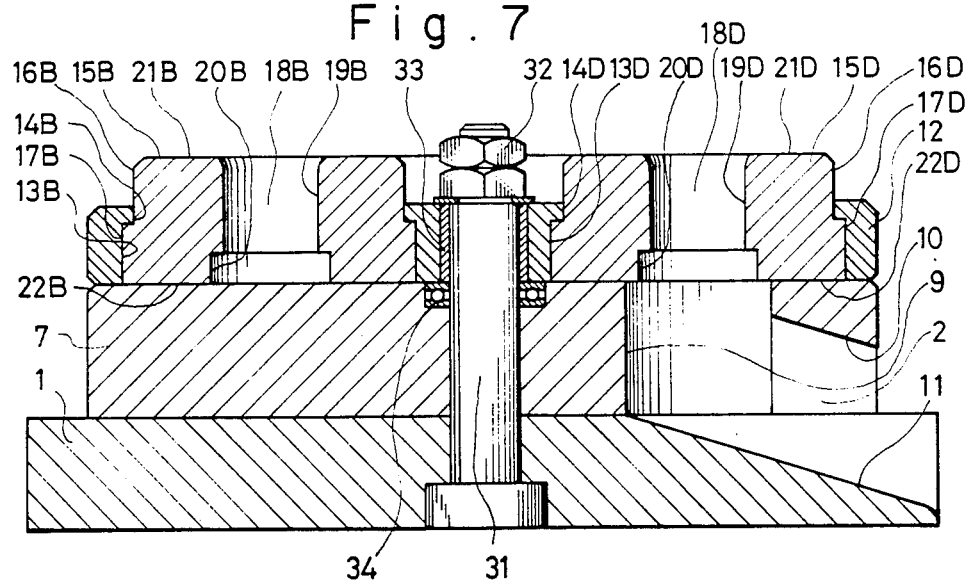
FIG. 7 is a vertical cross-sectional view taken along line VII—VII in FIG. 5
Figure 8:
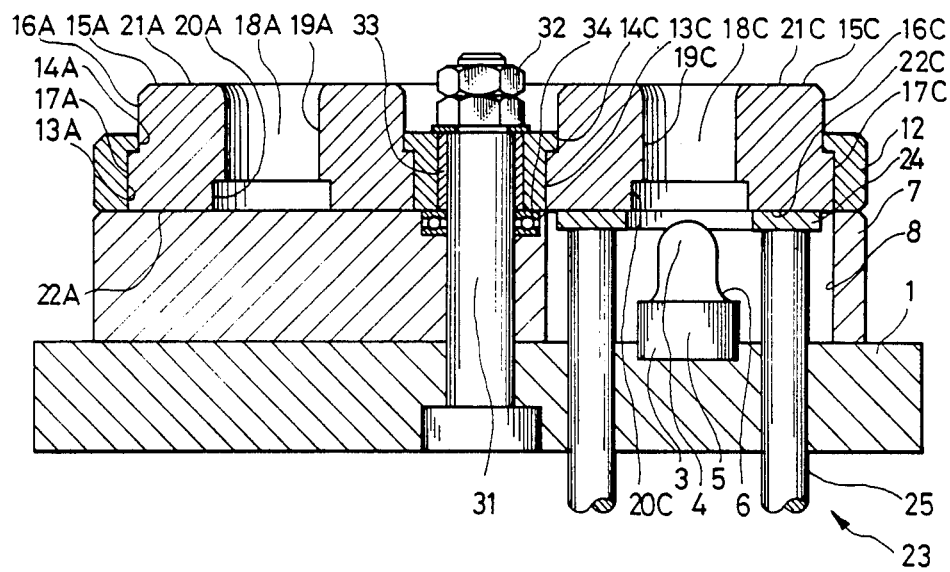
FIG. 8 is a cross-sectional view taken along line VIII—VIII in FIG. 5.
Figure 11:
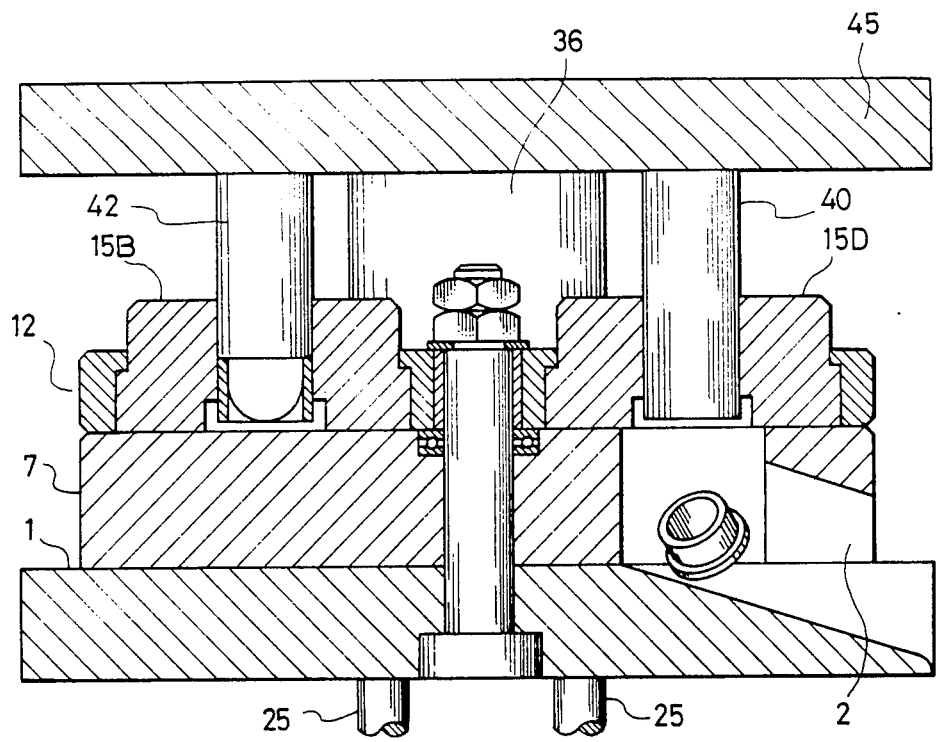
Figure 12:
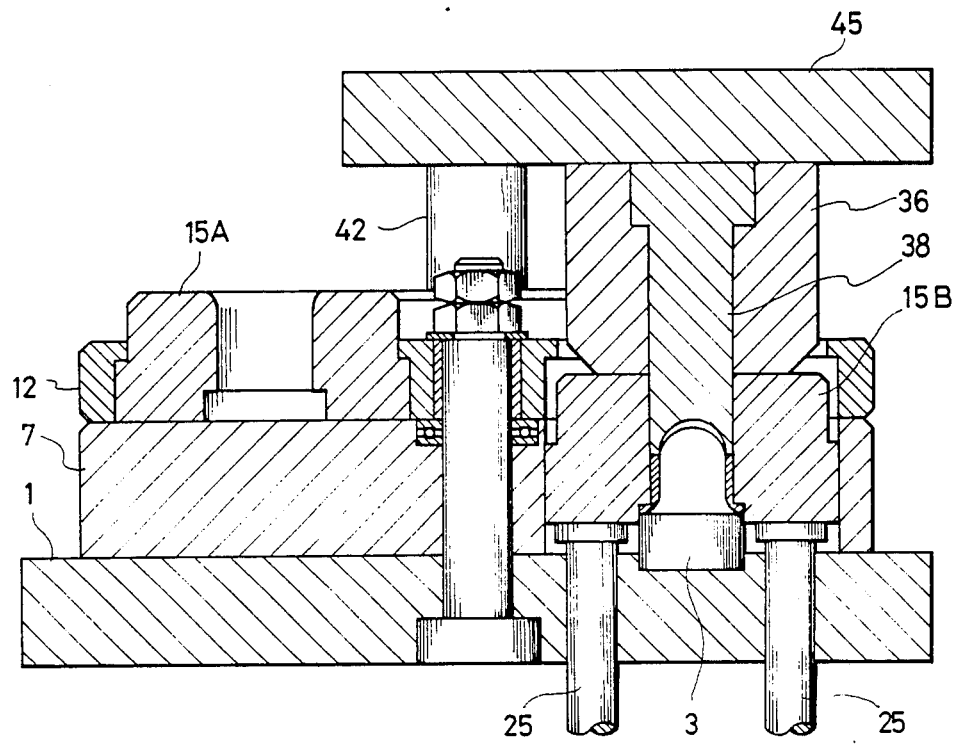

FIGS. 11 and 12 show the vertical cross-sectional views for the lower mold and the upper mold of the mold assembly for manufacturing the wound bush bearing according to this invention in a state of engagement, that is, coupled to each other for the production of the bearing. FIG. 11 is a cross-sectional view taken along line VII—VII in FIG. 5 and FIG. 12 is a cross-sectional view taken along line VIII—VIII in FIG. 5 and line XII—XII in FIG. 9. Since no further explanations with regard to the operation of the respective components or the like in FIG. 11 and FIG. 12 is required, the following explanation will be given for the manufacturing procedures of the wound bush bearing with flange by using the manufacturing mold according to this invention while only briefly referring to the respective operations thereof.

Figure 2:
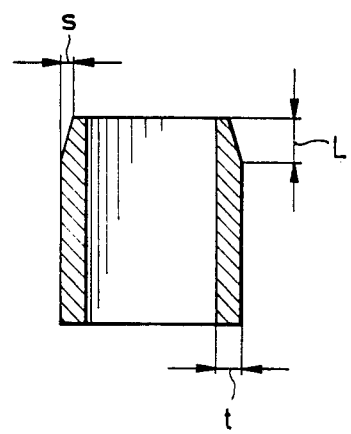

In the state where the lower mold shown in FIGS. 5 through 8 and the upper mold shown in FIGS. 9 and 10 are apart from each other, that is, in the mold open state, a previously fabricated bush workpiece shown in FIG. 2 is inserted at its tapered end into the die 15A in the lower mold. In this stage of the operation, the die 15B of the lower mold is inserted with a bush workpiece, the die 15C is charged with a bush workpiece, and the die 15D is charged with a bush bearing product.

Figure 3:
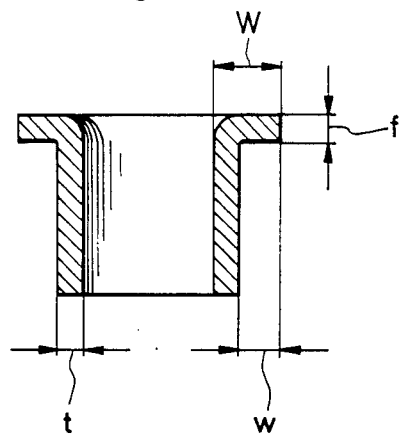
Figure 4:
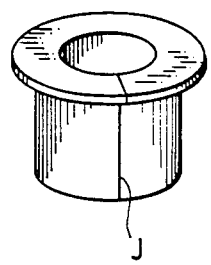

The upper mold is lowered toward the lower mold into the state shown in FIGS. 11 and 12. Thus, the bush workpiece is charged into the die 15B by the charging punch 42 of the upper mold. In the die 15C, a previously charged bush workpiece is pressed by the pressing punch 35 of the upper mold. Since the die 15C is also pressed by a portion of the pressing punch 35, the die 15C is lowered against the resilient force of the die return device 23 toward the first aperture 8 in the lower mold while being charged with the bush workpiece, whereby the opening at the tapered end of the bush workpiece is fitted over the lower punch 3. Then, the tapered end of the bush workpiece is bent outwardly in the radial direction to form a wound bush bearing that is, a bush bearing product shown in FIG. 3 and FIG. 4. In the die 15D, the fabricated bush bearing product is propelled downwardly by the ejecting punch 40 of the upper mold thereafter falling into the second aperture 9 in the lower mold. The bush bearing product is gravitationally guided to the inclined removal hole 2 and discharged out of the lower mold.

When the upper mold is separated upwardly from the lower mold, the die 15B is charged with the bush workpiece. The die 15C is charged with the bush bearing product since the die 15C is pushed upwardly from the first aperture 8 by the die return device 23. Moreover, the die 15D is in a state wherein the bush bearing product is being removed.

Then, the stopper device 26 is operated and the rotary table 12 of the lower mold is rotated by 90 degrees in the clockwise direction, whereby the die 15A moves to the position for the die 15B, the die 15B is moved to the position for the die 15C, the die 15C is moved to the position for the die 15D and the die 15D is moved to the position for the die 15A respectively.

Thereafter, by repeating the foregoing operations, the wound bush bearings with flange according to this invention can be manufactured continuously.

Although the foregoing explanation has been made for the illustrated embodiment of the mold assembly having four dies, the number of dies may be three instead of four. As is apparent from the foregoing descriptions, the mold assembly having three dies is substantially the same as the mold assembly having four dies excepting that the die arrangement is different (equilateral triangle arrangement) and the number of engaging holes formed in the outer circumference of the rotary table is changed from four to three.

Figure 13:
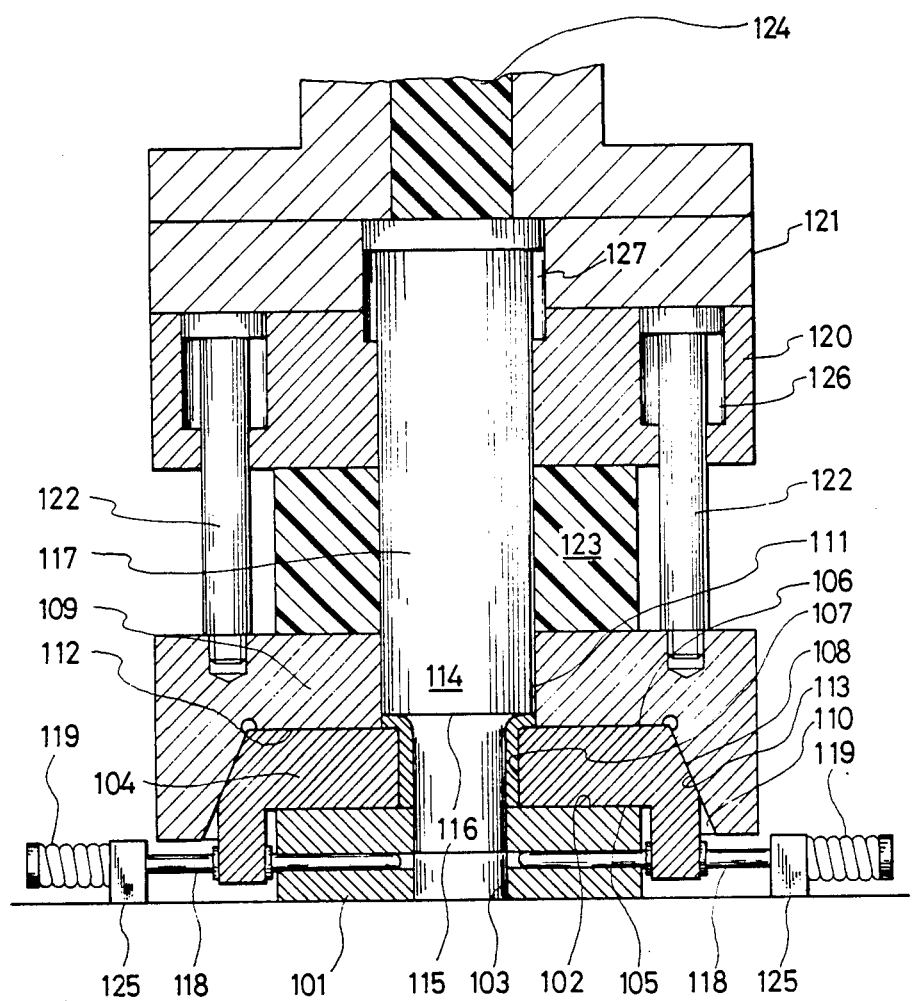

FIG. 13 shows another embodiment of a mold assembly for manufacturing a wound bush bearing with flange according to this invention. A lower mold 101 is secured, for instance, on the machine table of a press machine and it comprises a sliding surface 102 to be in sliding contact with a clamping mold to be described later and an aperture 103 for fittingly inserting and guiding the top end of a punch also to be described later.

A vertically split clamping mold 104 comprises a lower face 105 at which the mold is in sliding contact with the sliding surface 102 of the lower mold 101. The clamping mold 104 abuts at its upper surface 106 against the raised bottom of a flange clamping mold to be described later. An aperture 107 is formed between the upper and the lower surfaces 105 and 106 and a tapered surface 108 of the clamping mold diverges toward the lower mold. The aperture 107 has a diameter corresponding to the outer diameter of a wound bush when the split clamping mold is clamped together. It is necessary that the arcuate length of the aperture be equally divided and, usually, it is bisected such that respective semi-circles join to form a circular hole.

A flange clamping mold 109 has an opening 110 diverges downwardly generally in a U-shaped vertical cross-sectional shape. The mold 109 has an aperture 111 for fitting an enlarged diameter portion of the punch to described later, which opens toward the raised bottom face 112. A tapered surface 113 is diverges from the circumferential edge of the raised bottom face 112 toward the opening 110 for sliding contact with the tapered surface 108 of the clamping mold 104 described above.

By the engagement and sliding contact between the respective tapered surfaces 113 and 108 of the flange clamping mold 109 and the clamping mold 104, a cam slide mechanism is constituted and the cylindrical portion of a wound bush is pressed toward the axial center of the cylinder of the wound bush by the cam slide action of the clamping mold.

A punch 114 comprises a small diameter portion 115, a shoulder 116 and a larger diameter portion 117 integrally formed with the shoulder 116.

The smaller diameter portion 115 is tightly fitted into the inner bore of the cylindrical portion of the wound bush and the top end of the small diameter portion 115 is fitted into and guide by the aperture 103 in the lower mold 101.

The larger diameter portion 117 is tightly fitted into the aperture 111 in the flange clamping mold 109 while leaving a gap to form the flange of the wound bush.

The shoulder 116 of the punch 114 opposes the upper surface 106 of the clamping mold 104 and presses the flange of the wound bush in the axial direction therebetween. Since the aperture 111 having the diameter closely similar to the diameter of the larger diameter portion 117 of the punch has a bore diameter smaller than the diameter of the flange formed by bending the bush end in a state free from radial restriction, the wall of the aperture 111 presses the flange now being formed toward the axial center of the cylinder to cause plastic flow in the flange thereby enabling the formation of a wound bush having a flange with no notches. It is particularly preferred that the shoulder 116 have a smooth arcuate surface in the vertical cross-sectional configuration.

Each of rods 118 has a return spring 119 secured to each split piece of the vertically bisected clamping mold 114.

Each of the return springs 119 is mounted between the top end of each of the rods 118 and each of blocks 125 secured to the machine table. The spring applies, to the rod, a resilient force of sliding to open the clamping mold 104 when the engagement between the tapered surfaces of the flange clamping mold 109 and the clamping mold 104 is released.

Pusher pads 120, 121 are provided for the vertical movement of the flange clamping mold 109 and the punch 114, as well as for applying pressing force to them. An elastic member 123 is mounted between the pusher pad 120 and the flange clamping mold 109, and an elastic member 124 is mounted between a ram or the like (not illustrated) situated above the mold and the head of the punch 114. These elastic members serve to perform the initial mold clamping with their cushioning function.

Bolts 122, 122 are screwed at one ends thereof to the flange clamping mold and retained at the other ends thereof to the pusher pad 120 with a clearance 126 being present in the operating direction.

Another clearance 127 similar to the clearance 126 is formed to the top end of the punch and the pusher pads 120, 121 to improve the safety, smoothness and security upon mold clamping in co-operation with the elastic members 123 and 124.

As described above according to this invention, a wound bush bearing with flange with no notches in the flange part can be obtained in one pressing operation by the use of a wound bush tapered uniformly at the outer or the inner circumferential surface on one end so that the wall thickness is reduced toward the top of the end.

Although the foregoing explanation has been made with respect to the formation of a flange which is in perpendicular to the cylinder axis of the wound bush, but it is also possible, according to this invention, to form a flange with an angle other than the normal angle. Further, the flange may optionally take any other shapes than the illustrated circular shape.

The method of manufacturing the wound bush bearing with flange and the mold assembly for manufacturing such a bearing according to this invention have thus been described in details with respect to specific embodiments. However, it will be apparent to those skilled in the art that this invention is no way limited only to such embodiments but all of the modifications, equivalents and substitutions are included within the scope of the appended claims.

What is claimed is:

1. A mold assembly for manufacturing a wound bush bearing with a notch-free flange from a substantially cylindrical bush workpiece inserted therein, said workpiece having first and second end portions, the longitudinal axis of said workpiece defining an axial direction, said first end portion being uniformly tapered at at least one of the outer and inner circumferential surfaces so that the radial thickness of said first end portion is gradually decreased toward the end face of said first end portion, the length of said first end portion in said axial direction being greater than the width of a rear face of said flange to be formed, said mold assembly having an upper mold and a lower mold.
    (a) said upper mold comprising:
        (i) a punch having a smaller-diameter portion for restricting the radially inward movement of said inner circumferential surface of said workpiece, and a larger-diameter portion continuous with said smaller-diameter portion by way of a shoulder having a smoothly continuous configuration formed by a curved concave portion and an annular end face of said larger-diameter portion, said annular end face being disposed perpendicular to said axial direction when said smaller-diameter portion engages said inner circumferential surface of said workpiece, said punch being capable of applying a pressing force in said axial direction to said first end portion of said workpiece, said shoulder being configured such that said first end portion is bent radially outward during relative axial displacement of said punch and said workpiece in order to form said first end portion into a flange part, and
        (ii) a flange clamping mold having a larger-diameter bore for slidably receiving said larger-diameter portion of said punch, and restricting the radially outward movement of said first end portion in order to form said notch-free flange from said flange part, said flange clamping mold being movable axially together with said punch,
    (b) said lower mold comprising:
        (i) an end face member provided with a first smaller-diameter bore for slidably receiving said smaller-diameter portion of said punch, and restricting the movement of said second end portion of said workpiece on an upper face thereof, and
        (ii) a pair of vertically split clamping molds, each mounted on said upper face of said end face member so as to be slidable in a direction perpendicular to said axial direction, said vertically split clamping molds forming a second smaller-diameter bore for restricting the radially outward movement of said outer circumferential surface of said workpiece, the radius of said larger-diameter bore being greater than the radius of said second smaller-diameter bore by an amount substantially equal to the width of said rear face of said flange.

2. The mold assembly of claim 1, wherein said flange clamping mold and a pair set of said split clamping molds respectively have tapered surfaces that are in slidable contact with each other so that said flange clamping mold moves said split clamping molds in accordance with the movement of said upper mold in order to apply a pressing force to said outer circumferential surface of said workpiece in the radially inward direction by means of said split clamping molds.

3. A mold assembly for manufacturing a wound bush bearing with a notch-free flange from a substantially cylindrical bush workpiece inserted therein, said workpiece having first and second end portions, the longitudinal axis of said workpiece defining an axial direction, said first end portion being uniformly tapered at at least one of the outer and inner circumferential surfaces so that the radial thickness of said first end portion is gradually decreased toward the end face of said first end portion, the length of said first end portion in said axial direction being greater than the width of a rear face of said flange, said mold assembly having an upper mold and a lower mold,
    (a) lower mold comprising:
        (i) a die holder secured on a bolster of a pressing machine,
        (ii) a stationary table placed on said die holder and having first and second apertures,
        (iii) a rotary table rotatably mounted on said stationary table, having at least one die which has a smaller-diameter bore opened at one end thereof and arranged to restrict the radially outward movement of said outer circumferential surface of said workpiece when said workpiece is inserted in said die, and which has a larger-diameter bore opened at another end thereof in communication with said smaller-diameter bore and arranged to restrict the radially outward movement of said first end portion of said workpiece in order to form said notch-free flange from a flange part, the radius of said larger-diameter bore being greater than the radius of said smaller-diameter bore by an amount substantially equal to the width of said rear face of said flange, said rotary table sequentially moving said die to a charging position for charging said workpiece into said die, a pressing position for applying a pressing force to said workpiece, and an ejecting position for ejecting said workpiece, and (iv) a lower punch arranged in said first aperture of said stationary table, having a smaller-diameter portion for restricting the radially inward movement of said inner circumferential surface of said workpiece, and a larger-diameter portion being slidably received within said larger-diameter bore of said die, said larger-diameter portion being continuous with said smaller-diameter portion by way of a shoulder having a smoothly continuous configuration formed by a curved concave portion and an annular end face of said larger-diameter portion, said annular end face being perpendicular to said axial direction when said smaller-diameter portion engages said inner circumferential surface of said workpiece and (b) an upper mold comprising:

(i) a punch holder secured to a ram of said pressing machine, which is movable in said axial direction, (ii) a cylindrical charging punch which is slidably received within said smaller-diameter bore of said die when said die is moved to said charging position, said charging punch being secured to said punch holder at one end thereof and having a first end face perpendicular to said axial direction at another end thereof for charging said workpiece into said die at said charging position, (iii) a cylindrical pressing punch which is slidably received within said smaller-diameter bore of said die when said die is moved to said pressing position, said pressing punch being secured to said punch holder at one end thereof and having a second end face perpendicular to said axial direction at another end thereof for applying a pressing force in said axial direction to the end face of said second end portion of said workpiece so as to bend said first end portion of said workpiece radially outward along said shoulder in order to form said one end portion into said flange part, and (iv) a cylindrical ejecting punch which is slidably received within said smaller-diameter bore of said die when said die is moved to said ejecting position, said ejecting punch being secured to said punch holder at one end thereof and having a third end face perpendicular to said axial direction at another end thereof for ejecting said workpiece at said ejecting position so as to discharge said workpiece to said second aperture.

4. The mold assembly of claim 3, wherein said pressing punch moves said workpiece together with said die toward said lower punch upon applying said pressing force to said workpiece in said axial direction and said die thus moved is returned together with said workpiece into said rotary table after the pressing operation performed by said pressing punch on said workpiece is finished.

5. The mold assembly of claim 4, wherein said die is moved to said lower punch against a spring means of a die return device in a state where said die is seized between a part of said pressing punch and a supporting portion of said die return device and is returned into said rotary table by said spring means in the seized state.

6. The mold assembly of claim 5, wherein three dies are provided.

7. The mold assembly of claim 5, wherein three dies are provided.

8. The mold assembly of claim 4, wherein three dies are provided.

9. The mold assembly of claim 4, wherein at least four dies are provided.

10. The mold assembly of claim 3, wherein three dies are provided.

11. The mold assembly of claim 3, wherein at least four dies are provided.

12. A mold assembly for manufacturing a wound bush bearing with a notch-free flange from a substantially cylindrical bush workpiece inserted therein, said workpiece having first and second end portions, the longitudinal axis of said workpiece defining an axial direction, said first end portion being uniformly tapered at at least one of the outer and inner circumferential surfaces so that the radial thickness of said first end portion is gradually decreased toward the end face of said first end portion, the length of said first end portion in said axial direction being greater than the width of a rear face of said flange, said mold assembly having an upper mold and a lower mold, (a) said lower mold comprising:

(i) a die holder secured on a bolster of a pressing machine, (ii) a stationary table placed on said die holder and having first and second apertures, (iii) a lower punch fixed to said die holder at an end thereof and free at the other end thereof, arranged in said first aperture of said stationary table, and having a smaller-diameter portion formed on the free end thereof so as to restrict the radially inward movement of said inner circumferential surface of said workpiece, and a larger-diameter portion formed on the fixed end thereof and being continuous with said smaller-diameter portion by way of a shoulder having a smoothly continuous configuration formed by a curved concave portion and an annular end face of said larger-diameter portion, said annular end face being perpendicular to said axial direction when said smaller-diameter portion engages said inner circumferential surface of said workpiece, the radius of said larger-diameter bore being greater than the radius of said smaller-diameter bore by an amount substantially equal to the width of said real face of said flange, (iv) an ejectment hole for effecting communication of said second aperture of said stationary table with the outside of said die holder, (v) first through third dies each having a smaller-diameter bore opened at one end thereof so as to restrict the radially outward movement of said outer circumferential surface of said workpiece, and having a larger-diameter bore opened at another end thereof in communication wiht said smaller-diameter bore so as to restrict the radially outward movement of said first end portion of said workpiece in order to form said notch-free flange from a flange part, (vi) a rotary table rotably mounted on said stationary table and having first through third apertures for slidably receiving said first through third dies so as to move toward said stationary table, said rotary table sequentially moving said dies received in said first through third apertures of said rotary table respectively to a first position corresponding to neither said first aperture nor said second aperture of said stationary table, a second position corresponding to said first aperture of said stationary table and a third position corresponding to said second aperture of said stationary table, (vii) a die return device having a supporting portion for supporting each of said dies within said first through third apertures of said rotary table when each of said dies is moved to said second position and a spring means fixed to said stationary table for resiliently biasing said die in said second position and said supporting portion toward said rotary table in a state where said die in said second position is supported on said supporting portion, and (viii) a stopper device for engaging said rotary table such that two of said dies are stopped at said second and third positions during the movement of said dies together with said rotary table, and (b) an upper mold comprising:

(i) a punch holder secured to a ram of said pressing machine, which is movable in said axial direction, (ii) a cylindrical charging punch which is slidably received within said smaller-diameter bore of the die moved to said first position, said charging punch being secured to said punch holder at one end thereof and having a first end face perpendicular to said axial direction at another end thereof for charging said workpiece into the die at said first position, (iii) a cylindrical pressing punch which is slidably received within said smaller-diameter bore of the die moved to said second position, said pressing punch being secured to said punch holder at one end thereof and having a second end face perpendicular to said axial direction at another end thereof for applying a pressing force in said axial direction to the end face of the second end portion of said workpiece and said die moved to said second position in order to lower said die together with said workpiece in said first aperture and toward said lower punch, in a state where said pressing punch and said die are placed on said die return device, and in order to bend said first end portion of said workpiece radially outward along said shoulder so as to form said first end portion into said flange part, and (iv) a cylindrical ejecting punch which is slidably received within said smaller-diameter bore of the die moved to said third position, said ejecting punch being secured to said punch holder at one end thereof and having a third end face perpendicular to said axial direction at another end thereof for ejecting said workpiece at said third position so as to discharge said workpiece to said second aperture.

* * * * *